(12) United States Patent
Amstel Van et al.

(10) Patent No.: US 6,862,876 B2
(45) Date of Patent: Mar. 8, 2005

(54) GATHERING ELEMENT FOR A PISTON PRESS

(75) Inventors: Leonardus H. M. Amstel Van, Geldrop (NL); Matthijs J. Wondergem, Oost-Souburg (NL); Leonardus J. Wildenberg Van Den, Budel (NL); Jean-Claude Galant, Rebrechien (FR)

(73) Assignee: Kverneland Geldrop BV, Geldrop (NL)

(*) Notice: Subject to any disclaimer, the term of this patent is extended or adjusted under 35 U.S.C. 154(b) by 9 days.

(21) Appl. No.: 10/276,716

(22) PCT Filed: Dec. 21, 2001

(86) PCT No.: PCT/EP01/15221

§ 371 (c)(1),
(2), (4) Date: May 21, 2003

(87) PCT Pub. No.: WO02/074065

PCT Pub. Date: Sep. 26, 2002

(65) Prior Publication Data

US 2003/0172640 A1 Sep. 18, 2003

(30) Foreign Application Priority Data

Mar. 19, 2001 (DE) .................................. 201 04 700 U

(51) Int. Cl.[7] .............................................. A01D 39/00
(52) U.S. Cl. .......................................... 56/341; 100/88
(58) Field of Search ............................... 56/341; 100/88

(56) References Cited

U.S. PATENT DOCUMENTS

| | | | | |
|---|---|---|---|---|
| 4,569,282 A | | 2/1986 | Galant ........................ | 100/189 |
| 4,644,862 A | * | 2/1987 | Young ........................ | 100/189 |
| 5,467,702 A | * | 11/1995 | Naaktgeboren et al. ........ | 100/35 |
| 5,768,872 A | | 6/1998 | Von Allwörden ............ | 56/341 |
| 6,425,234 B1 | * | 7/2002 | Krone et al. .................. | 56/341 |

FOREIGN PATENT DOCUMENTS

| | | |
|---|---|---|
| DE | 36 38 792 A1 | 5/1988 |
| DE | 39 13 496 A1 | 12/1989 |
| DE | 197 15 280 A1 | 10/1998 |
| DE | 198 29 276 A1 | 1/2000 |
| EP | 0 508 186 A1 | 10/1992 |

* cited by examiner

*Primary Examiner*—Meredith Petravick
(74) *Attorney, Agent, or Firm*—Finnegan, Henderson, Farabow, Garrett & Dunner, L.L.P.

(57) ABSTRACT

In a piston press for bales of harvested material, comprising a plunger piston (K) movable forwards and backwards, a feeding channel (Z) including a reel (R), driven by a crank mechanism, with reel levers (10) on a crankshaft journal (8) of the crank mechanism, a control drive, and a switching device (V) for changing the movement path (l, f) of the reel tips between loading and feeding strokes, wherein a control arm (11) elongating the reel lever (10) is coupled with a control rod (13) supported in a displaceable control joint (G) and the control joint (G) is fixable in at least one position corresponding to a feeding stroke movement path, the control joint (G) is fixed only in the position for a feeding stroke (l) while it remains freely movable during each loading stroke (f).

14 Claims, 2 Drawing Sheets

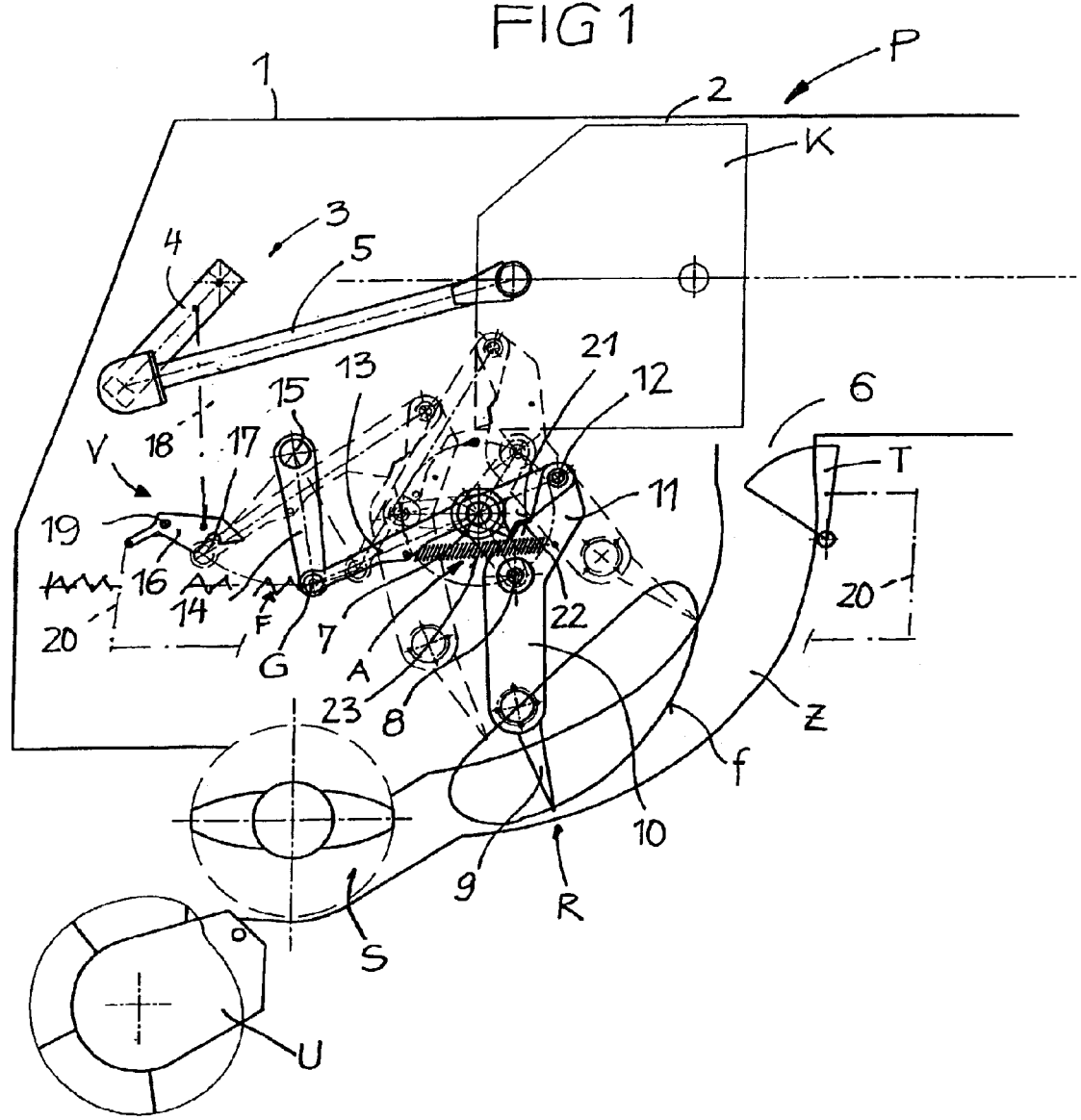

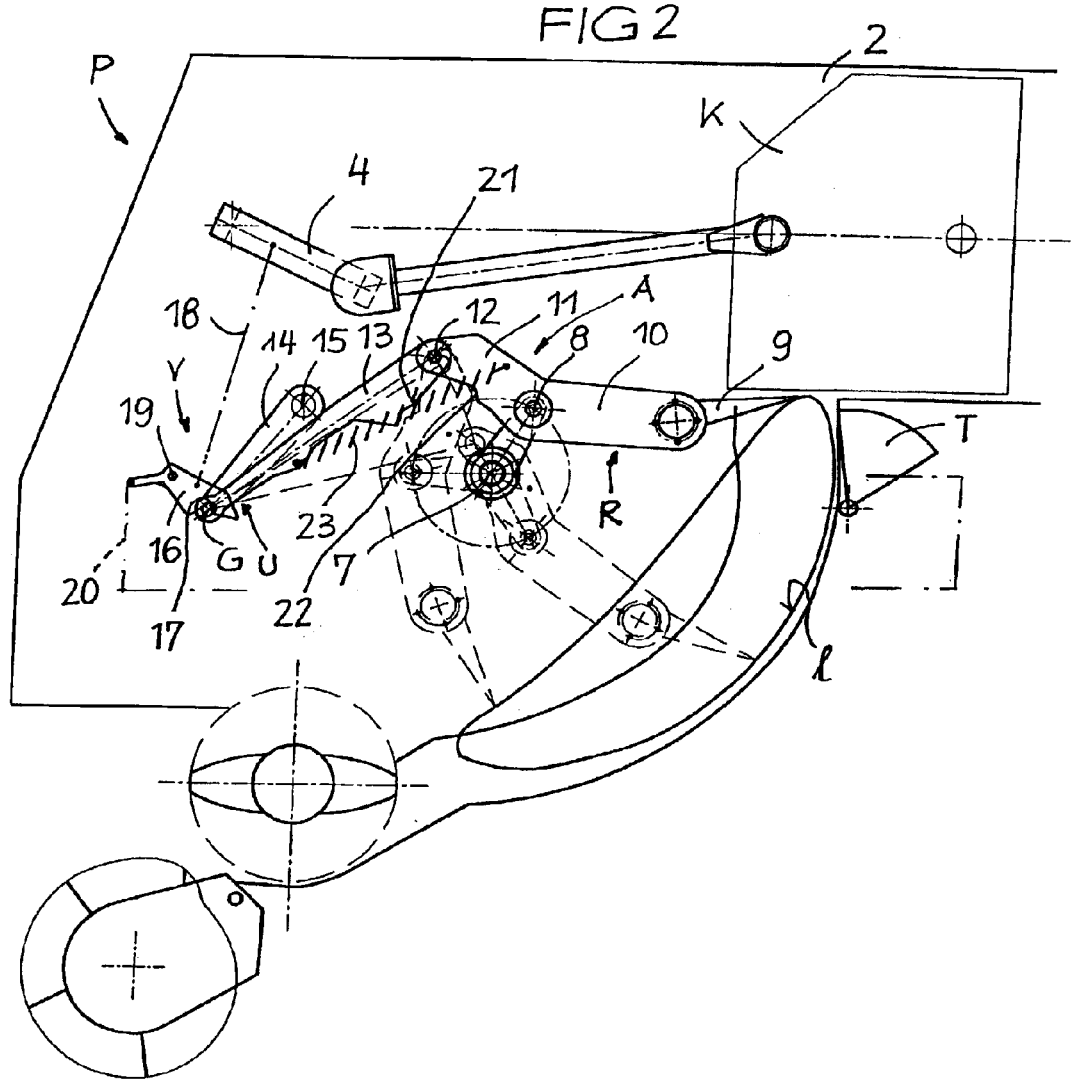

GATHERING ELEMENT FOR A PISTON PRESS

BACKGROUND OF THE INVENTION

The invention relates to a piston press for bales of harvested material.

In the piston press known from DE 197 15 280, the control joint arranged on a control lever supported in a stationary pivot bearing is forcibly coupled with a drive of the switching device. The drive retains, in a basic position, the control joint in a predefined position on the basis of which results the movement path of the reel tip for a loading stroke. The drive can be actuated optionally as to adjust the control joint into the position in which the reel tips carry out the movement path of the feeding stroke and to retain the same in said position. The adjustment of the switching device takes place either in timed agreement with the movement of the plunger piston and derived from the plunger piston drive, or, in addition, by taking into account a signal from a sensor, which indicates that the harvested material in the feeding channel is enough for a feeding stroke or that said harvested material is sufficiently precompressed. The forcible coupling of said control joint with the drive, the drive control and a spring-loaded release connection between the control lever carrying the control joint and the sensor are laborious from a constructional point of view, require a plurality of joints susceptible to wear and a large construction space. Each switching action is associated with an undesired jerk.

In the piston press known from DE 36 38 792 A, a control lever carrying the control joint and pivotable about the axis of the crank mechanism is permanently moved forwards and backwards between two positions by means of a drive, in response to the stroke movement of the plunger piston. By selecting the transmission ratio 1:3 between the drive of the plunger piston and the crank mechanism of the reel, the reel forcibly carries out two loading strokes respectively, followed by a feeding stroke as a third stroke. The control drive for the permanent adjustment of the control joint between its two possible positions, which define the movement paths for the loading or, respectively, the feeding strokes, is complicated. Moreover, it is impossible to omit a feeding stroke if the feeding channel is not sufficiently filled, when said feeding stroke becomes due as the third stroke.

In the piston press according to EP 0 120 780 A the control lever carrying the control joint is pivotably mounted on a stationary pivotably mounted carrier, which is cyclically waved forwards and backwards by the crank mechanism of the plunger piston. A toothed gearing is disposed between the pivoting axis of the control lever on the carrier and the stationary pivoting axis of the carrier, by which the control lever is continuously rotationally driven about its pivoting axis on the carrier via a belt drive. This results in a forced succession of a plurality of gradually increasing loading strokes and a finalizing feeding stroke. The expenditure in the control drive in view of the installation is, however, extremely high.

Additional prior art is described in DE 198 29 276 A, U.S. Pat. No. 5,768,872 A, DE 39 13 496 A and EP 0 508 186 A.

The invention is based on the object of providing a piston press of the aforementioned type characterized by a control drive for the different movement paths of the reel tips which is easy in construction, saves space, is resistant to wear and safe during the operation.

SUMMARY OF THE INVENTION

More particularly, the present invention provides a piston press for bales of harvested material, comprising a plunger piston movable forwards and backwards in a baling channel, a feeding channel merging into the baling channel, in which a reel driven by a crank mechanism is movable and includes reel levers transporting by means of reel tips and each linked to a crankshaft journal of the crank mechanism, with a control drive, and comprising a switching device for changing the movement path of the reel tips adjusted by the control drive between loading and feeding strokes, wherein a control arm elongating the reel lever in the control drive via the crankshaft journal is coupled in a joint with a control rod supported in a displaceable control joint, which can be fixed by the switching device in at least one position corresponding to a movement path of the feeding stroke, characterized in that the control joint is fixed only in the position for a feeding stroke and remains freely movable during each loading stroke.

The control joint no longer requires an independent drive, as the control joint as such moves freely with the reel thereby carrying out the movement path for a loading stroke with its reel tips. At least once during such a movement path the control joint is brought into an extreme position by the reel, which is required for the movement path off the feeding stroke. The switching device then merely has to fix the control joint in said position to perform a feeding stroke. Apart from the movement guide assembly of the control joint and the simple switching device, no additional components are contained in the control drive. The control joint can move freely during the loading stroke and is retained only for a feeding stroke. Therefore, the control drive is easy to construct and is limited to a minimum in so far as locations of the joint being subject to wear are concerned. The operational safety is high, and the space required for the installation thereof is small.

The switching device is switched only in the extreme position of the control joint and when the control joint stands still for a moment. Thus, impacts are avoided.

The movement guide assembly of the control joint is, from a constructional aspect, easily formed by the stationary pivotably mounted control lever. If the axis thereof is positioned on the side of the crank mechanism for the reel facing away from the feeding channel, and the control lever extends from its pivoting axis roughly in the direction of the feeding channel, i.e. if it is disposed in a suspending manner, a favorable curved path for the control joint is formed, which superimposed on the rotational movement of the crank mechanism entails favorable forms of the movement paths for the loading strokes and the feeding strokes. The control joint could alternatively move in a freely designable guideway.

Especially useful is a stop coupling between the control arm of the reel lever and the control rod, which, by the movement path of a loading stroke, is at least substantially engaged and transmits possible reaction moments from the counter-pressure of the harvested material in the feeding channel on the reel tips, relative to the crank pin, to the control joint and the pivot bearing of the control lever thereof, or to the aforementioned guideway of the control joint.

As the stop coupling remains substantially engaged at least by the movement path during the loading stroke, it is also responsible for bringing the control joint, at least once during said movement path, into the position in which the switching device can easily become engaged so as to switch over to a movement path for a feeding stroke and to fix the control joint in said position. As the stop coupling only acts in one direction of movement, it is released automatically when the reel tips define the movement path for a feeding stroke.

For the engagement of the stop coupling and for keeping the same in its engaged state it is, moreover, favorable to provide at least one spring element disposed in a biased state between the control arm of the reel lever and the control rod, preferably on the side of the joint facing the feeding channel. By a movement path of a loading stroke the spring element keeps the stop coupling at least substantially in engagement. By the movement path of a feeding stroke the spring element is elongated, as the control joint is fixed, and the stop coupling is engaged, if at all, only once for a short time.

In the easiest case an actuating connection is provided only between the plunger piston drive and the switching device so as to forcibly adjust the switching device in agreement with the movement of the plunger piston. In order to omit a feeding stroke when the feeding channel is not sufficiently filled, or for other reasons, it is, however, very useful to produce another actuating connection to a sensor sensing the fill factor or the precompression in the feeding channel and overmodulating the control of the switching device in response to the stroke of the plunger piston for, if required, replacing a feeding stroke by a loading stroke.

Under the constructional aspect the switching device is simply equipped with a catch comprising a catch mouth for the control joint so as to grasp and fix the control joint as soon as it has been brought into the right position by the reel lever during a loading stroke. The catch can be mounted in a stationary manner and, therefore, also adsorbs high reaction forces from the reel.

Alternatively, it may be useful to have the control joint adjusted against the spring load in its position temporarily fixed by the switching device, e.g. under the reaction force of the reel. Thus, a significant safety aspect can be incorporated in the drive, as—despite the fixing by the switching device—the control joint is not supported in a completely rigid manner, and the movement paths may, if necessary, be modified individually.

A safety coupling may be provided in the area of the switching device, which, for example, releases the control joint in case of a blockage.

For obtaining, for example, a favorable movement path with acceleration and deceleration phases for the reel tips on the right locations inside the feeding channel, it may be useful to design the driving crank arm of the reel lever shorter than the control arm of the reel lever and to construct the control rod with approximately the length of the reel lever, to construct the control lever carrying the control joint with approximately the length of the control arm on the reel lever, and to arrange the switching device on the side of the crank mechanism facing away from the control lever.

Despite relatively small components it is possible to obtain a long movement path during the feeding stroke, if the stop coupling is engaged in the joint at an angle of <90°, so that the control arm of the notch lever can nearly be brought into an elongated position relative to the control rod, when the position of the control joint is fixed.

Finally, a biasing spring permanently acting on the control joint in the direction of the extreme position may be provided.

BRIEF DESCRIPTION OF THE DRAWINGS

Embodiments of the subject matter according to the invention are explained by means of drawings, wherein FIG. 1 schematically shows a longitudinal section of a part of a piston press, the control drive of which is adjusted to a reel tip movement path for a loading stroke, FIG. 2 schematically shows a longitudinal section of the part of the piston press, the control drive of which is adjusted to a reel tip movement path for a feeding stroke, FIG. 3 shows a detail variant, and FIG. 4 shows another detail variant.

DETAILED DESCRIPTION OF THE INVENTION

A piston press P for producing bales from harvested material (e.g. a large bale press), which is shown in FIGS. 1 and 2 in different operating phases, comprises a plunger piston K in a housing, moveable in a forward and backward movement in a baling channel 2 by means of a crank mechanism 3. The crank mechanism 3 comprises, for example, a driving crank 4 driven about a stationary axis at a predetermined rotational speed and displaces the plunger piston K via a connecting rod 5 over an inlet 6 of a feeding channel Z. The feeding channel Z leads from the inlet side of the housing 1 and a pick-up device U, and possibly via a cutting tool S, to the bottom side of the baling channel 2. A filling sensor T is disposed directly in front of the inlet 6, which is capable of sensing the fill factor in the feeding channel Z or, respectively, the precompression of the harvested material contained therein, which is not illustrated, and which transmits corresponding signals via a connection 20 (mechanically, hydraulically, electrically). The filling sensor T could also be positioned at a position other than the one shown (on the reel R, on the reel tips 9, in the crank mechanism of the reel or in a joint of the control drive, etc.).

A reel F works in the feeding channel Z, which is caused to make a shoveling movement by another crank mechanism, via a crank comprising a crankshaft journal 8 and being rotationally driven about a stationary axis 7 (direction of rotation counterclockwise).

The reel R comprises reel tips 9 at the free end of a reel lever 10 linked on the crankshaft journal 8. Beyond the crankshaft journal 8, bent off upwardly, the reel lever 10 is extended to form a control arm 11 connected in a joint 12 to a control rod 13, which is passed to a control joint G. The control joint G is movable, in view of the embodiment as shown, for example, along a curved path defined by a control lever 14 carrying the control joint G and pivotable about a stationary axis 15. The control joint G and/or the control lever 14 may permanently be loaded by a biasing spring F (FIG. 1) in the direction towards the extreme position. Components 11, 12, 13, G, 14, 15 (F) form a control drive for the respective movement path of the reel tips 9.

In the embodiment as shown the reel tips 9 are passed in two different movement paths f and l (FIGS. 1 and 2), at least partially in the feeding channel Z. The movement path f represents a loading stroke of the reel R, whereby a charge of harvested material is transported into the proximity of the inlet 6, where it is precompressed. The movement path l represents a feeding stroke, whereby the reel R transports harvested material into the baling channel 2 and in front of the plunger piston K.

The rotational speed of the crank mechanism 3 is adapted to agree with the rotational speed of the crankshaft journal 8 such that the crankshaft journal 8 performs, for instance, two full revolutions while the crank 4 performs one revolution.

A ratio of 1:3 or smaller, or even 1:1, would be conceivable. Moreover, the agreement is made such that the reel R transports harvested material into the baling channel 2 only if the plunger piston K has moved back behind the inlet 6 before.

A switching device V is provided for the control drive, with which the movement path l is adjusted. In the embodiment as shown the switching device V comprises a catch 16 pivoting about a stationary axis 19 in the housing 1 and connected, for instance, with the crank 4 via an actuating connection 18. Via connection 20 also the signal from the filling sensor T can be transmitted to the catch 16, namely directly or via an actuator. If the sensor T is provided and functionally linked with the switching device V, the signal from sensor T overmodulates the actuating connection 18 such that the catch 16 is adjusted to the lowered position shown in FIG. 2 only, if the sensor T has detected a sufficient fill factor in the feeding channel or, respectively, a sufficient precompression of the harvested material. If this is not the case, catch 16 is held by sensor T in the lifted position shown in FIG. 1, although the actuating connection 18 wants to adjust the catch 16 into the lowered position. An actuation of the switching device V only takes place in the extreme position of the control joint G, which then also stands still. The catch 16 can be controlled by a non-illustrated spring and a stop from the lifted position in FIG. 1 into the lowered position according to FIG. 2. Instead of catch 16 another switching device V may be used, which is capable of optionally positioning the control joint G or of leaving it freely movable.

A stop coupling A is provided between the control arm 11 of the reel lever 10 and the control rod 13, which, in the embodiment as shown, comprises stop faces 21, 22 on the control arm 11 and on the control rod 13. The stop faces 21, 22 are preferably each U-bent in a fashion adapted to fit to one another. In the adjustment condition of the control drive shown in FIG. 1 (the catch 16 is lifted, the catch mouth 17 cannot fix the control joint G) the stop coupling A may be engaged over the entire movement path f, whereby the control arm 11 with the control rod 13 encloses an angle <90° in view of the joint 12. Additionally provided is at least one biased spring element 23 anchored on the side of joint 12 on control arm 11 facing the reel tips 9 on one hand, and on the control rod 13 on the other hand, which loads the stop faces 21, 22 to one another.

In the control condition shown in FIG. 1 the stop coupling A remains substantially engaged over the entire movement path f. The transport resistance of the harvested material in the feeding channel Z produces a reaction torque in the reel lever 10 about the crankshaft journal 8 (in clockwise direction), which holds the stop coupling A engaged and is transmitted to the pivoting axis 15 of the control lever 14 by means of the control rod 13. The control joint is freely moved forwards and backwards along the curved path about the pivoting axis 15. As long as the sensor T does not detect a sufficient fill factor or, respectively, a sufficient precompression of the harvested material, the catch 16 remains in a lifted position. With each full revolution of the crankshaft journal 8 the control joint G is brought into the extreme position once (illustrated by a dotted line) in which the catch mouth 17 of the catch 16 would be capable of grasping and fixing the control joint G.

The control rod 13 extends from joint 12 in the direction of the switching device V. The control lever 14 is mounted in a suspending fashion, i.e. its pivoting axis 15 is positioned at the top while the control joint disposed on the free end of the control lever 14 is underneath thereof. The length of the control rod 13 substantially corresponds to the length of the reel lever 10 with its control arm 11. The crank arm of the crankshaft journal 8 is slightly shorter than the control arm 11 of the reel lever 10. The control arm 11 is approximately as long as the control lever 14. This applies, for instance, only to the embodiment as shown. In practice deviations may occur.

In the control condition shown in FIG. 2 the sensor T has detected a sufficient fill factor or, respectively, a sufficient precompression of the harvested material in the feeding channel Z and has generated a signal permitting the lowering of catch 16 via the actuating connection 18 by crank 4. As soon as the control joint G is brought into the catch area of catch mouth 17, namely when the reel tips 9 move along the movement path f according to FIG. 1, the control joint G (FIG. 2) is fixed in this position. During the further rotational movement of the crankshaft journal 8 the stop coupling A is released and the spring element 23 is elongated. The control arm 11 adapts relative to the control rod 13 a nearly elongated position, so that the reel tips 9 then travel through the movement path 1 and perform a loading stroke, whereby the harvested material (at least a precompressed charge) is transported into the front of the retracted plunger piston and is subsequently pressed to form a bale. During the ongoing movement of crank 4 the catch 16 is lifted again by the actuating connection 18, so that the catch mouth 17 releases the then still standing control joint G and, thereupon, the movement path f according to FIG. 1 is again traveled through, whereby the control joint G with control lever 14 is capable of moving freely.

FIG. 3 shows a detail variant for the switching device V, whereby the catch 16' comprises a counter-bearing 24 displaceable against a spring 26 in a sliding guide assembly 25. Thus, the control joint G, which is fixed as such, can perform a safety stroke against the spring load, whereby a movement path could be traveled through which, in design and size, approximately ranges between movement paths f and 1. Said spring-loaded stroke may also be useful for safety reasons. The adjustment of catch 16' is effected by the actuating connection 18 or, respectively, by connection 20, whereby the connection 20 can overmodulate the actuating connection 18.

In the detail variant according to FIG. 4 the catch 16" is disposed on a piston rod 27 of a piston 28 displaceably mounted in a cylinder 29. The piston 28 can be adjusted against a spring 26. Catch 16" is adjusted by the actuating connection 18 and/or 20 about its pivoting axis 19.

The control drive according to FIGS. 1 to 4 is simple and compact under the constructional aspect. It does not require a permanent forcible control derived from the movement of the plunger piston K or the crankshaft journal 8, because the control joint G, as the stop coupling A is engaged, is at least once per stroke brought into the position by the reel R, in which the switching device V can engage with the then still standing control joint G so as to fix the same for the movement path 1. Only the switching device V has to be adjusted. In FIG. 2 a safety coupling U is outlined in the area of the switching device V, which, for example in the case of a blockage, allows the control joint G to become released in a load-controlled manner despite the actuated switching device.

If switching with an overmodulation through sensor T is not desired, it can be predetermined by the transmission ratio between the crank 4 and the crankshaft journal 8 as to how many loading strokes are performed by the reel R, before a feeding stroke follows. If, however, sensor T is functionally included, it depends on the fill factor or, respectively, on the precompression in the feeding channel as to how many loading strokes are performed before a feeding stroke. The transmission ratio between the crank 4 and the crankshaft journal 8 is then of secondary significance. It would even be possible to omit the actuating connection 18 and to ensure by other means that the switching device V only fixes the control joint G when the plunger piston K is in the correct position.

What is claimed is:

1. A piston press for bales of harvested material comprising:
   a plunger piston movable forwards and backwards in a baling channel;
   a feed channel merging into the bailing channel;
   a reel driven by a crank mechanism and movable in the feeding channel, said reel having reel levers for transporting harvested material in the feeding channel into the bailing channel, by means of reel tips on the reel levers;
   a crankshaft journal linking each reel lever to the crank mechanism; and
   a control drive having a switching device for changing a path of movement of the reel tips between loading and feeding strokes;
   wherein the crank mechanism includes a control arm connected to each reel lever via the crankshaft journal and pivotably coupled to a control rod by a joint; the control rod is supported in a displaceable control joint, which can be fixed by the switching device in at least one position corresponding to the path of movement of the feeding stroke;
   wherein the control joint is fixed only in the position for the feeding stroke and remains freely movable during each loading stroke; and
   wherein the control joint is movable by the reel during the loading stroke to the position for the feeding stroke where it can be fixed by the switching device.

2. The piston press of claim 1, wherein the switching device can be actuated to fix the control joint in position for the feeding stroke with a substantially motionless movement of the control joint.

3. The piston press of claim 1, wherein the actuating connection is provided between the switching device and a feeding channel filling sensor.

4. A piston press for bales of harvested material comprising:
   a plunger piston movable forwards and backwards in a baling channel;
   a feed channel merging into the bailing channel;
   a reel driven by a crank mechanism and movable in the feeding channel, said reel having reel levers for transporting harvested material in the feeding channel into the bailing channel, by means of reel tips on the reel levers;
   a crankshaft journal linking each reel lever to the crank mechanism; and
   a control drive having a switching device for changing a path of movement of the reel tips between loading and feeding strokes;
   wherein the crank mechanism includes a control arm connected to each reel lever via the crankshaft journal and pivotably coupled to a control rod by a joint; the control rod is supported in a displaceable control joint, which can be fixed by the switching device in at least one position corresponding to the path of movement of the feeding stroke;
   wherein the control joint is fixed only in the position for the feeding stroke and remains freely movable during each loading stroke; and
   wherein the control joint is arranged on a pivotably mounted control lever in a suspended manner, so that a pivoting axis of the control lever is positioned on a side of the crank mechanism facing away from the feeding channel.

5. The piston press of claim 4, wherein a stop coupling is provided between the reel and the control rod, via which, if the control joint is released by the switching device, a reaction movement of the reel in response to the harvested material is supported about its crankshaft journal on the control lever or a movement guide assembly of the control joint.

6. The piston press of claim 5, wherein the stop coupling is engaged at least substantially over the path of movement of a full loading stroke.

7. The piston press of claim 5, wherein the stop coupling includes stops arranged on the control arm of the reel and on the control rod.

8. The piston press of claim 5, wherein at least one spring element acting in an engagement direction of the stop coupling is provided between the control arm of the reel lever and the control rod.

9. The piston press of claim 5, wherein the stop coupling is engaged at an angle less than 90° in the joint coupling the control arm and the control rod.

10. The piston press of claim 4, wherein a driving crank arm of the crankshaft journal is shorter than the control arm of the reel lever, the control rod between the joint coupling the control rod to the control arm and the control joint is approximately as long as the control arm of the reel lever, and the switching device is arranged on the side of the control joint facing away from the crank mechanism.

11. The piston press of claim 4, wherein the control joint or the control lever is loaded by a biasing spring in the direction of the position for a feeding stroke.

12. A piston press for bales of harvested material comprising:
   a plunger piston movable forwards and backwards in a baling channel;
   a feed channel merging into the bailing channel;
   a reel driven by a crank mechanism and movable in the feeding channel, said reel having reel levers for transporting harvested material in the feeding channel into the bailing channel, by means of reel tips on the reel levers;
   a crankshaft journal linking each reel lever to the crank mechanism; and
   a control drive having a switching device for changing a path of movement of the reel tips between loading and feeding strokes;
   wherein the crank mechanism includes a control arm connected to each reel lever via the crankshaft journal and pivotably coupled to a control rod by a joint; the control rod is supported in a displaceable control joint, which can be fixed by the switching device in at least one position corresponding to the path of movement of the feeding stroke;
   wherein the control joint is fixed only in the position for the feeding stroke and remains freely movable during each loading stroke; and
   wherein the switching device comprises a catch with a catch mouth for the control joint pivotable about a stationary axis.

13. A piston press for bales of harvested material comprising:
   a plunger piston movable forwards and backwards in a baling channel;
   a feed channel merging into the bailing channel;
   a reel driven by a crank mechanism and movable in the feeding channel, said reel having reel levers for transporting harvested material in the feeding channel into the bailing channel, by means of reel tips on the reel levers;

a crankshaft journal linking each reel lever to the crank mechanism; and a control drive having a switching device for changing a path of movement of the reel tips between loading and feeding strokes;

wherein the crank mechanism includes a control arm connected to each reel lever via the crankshaft journal and pivotably coupled to a control rod by a joint; the control rod is supported in a displaceable control joint, which can be fixed by the switching device in at least one position corresponding to the path of movement of the feeding stroke;

wherein the control joint is fixed only in the position for the feeding stroke and remains freely movable during each loading stroke; and wherein the control joint when fixed by the switching device in the position for the feeding stroke is adjustable against a spring load in the direction of pull of the control rod.

14. A piston press for bales of harvested material comprising:

a plunger piston movable forwards and backwards in a baling channel;

a feed channel merging into the bailing channel;

a reel driven by a crank mechanism and movable in the feeding channel, said reel having reel levers for transporting harvested material in the feeding channel into the bailing channel, by means of reel tips on the reel levers;

a crankshaft journal linking each reel lever to the crank mechanism; and a control drive having a switching device for changing a path of movement of the reel tips between loading and feeding strokes;

wherein the crank mechanism includes a control arm connected to each reel lever via the crankshaft journal and pivotably coupled to a control rod by a joint; the control rod is supported in a displaceable control joint, which can be fixed by the switching device in at least one position corresponding to the path of movement of the feeding stroke;

wherein the control joint is fixed only in the position for the feeding stroke and remains freely movable during each loading stroke; and wherein a safety coupling is provided in the switching device or between the switching deice and the control joint to allow the control joint to be released in case of blockage of the feeding channel.

* * * * *